May 12, 1970  A. E. BLANCHARD ET AL  3,511,339
HYDRAULICALLY POWERED TOWER ASSEMBLY WITH PNEUMATIC DRIVE
AND CONTROL ACCESSORIES
Filed Jan. 8, 1968

INVENTORS.
ALBERT E. BLANCHARD
EARL E. NOFZINGER
BY
ATTORNEYS

United States Patent Office 3,511,339
Patented May 12, 1970

3,511,339
HYDRAULICALLY POWERED TOWER ASSEMBLY WITH PNEUMATIC DRIVE AND CONTROL ACCESSORIES
Albert E. Blanchard, Temple City, and Earl E. Nofzinger, Azusa, Calif., assignors to G. W. Galloway Company, Baldwin Park, Calif., a corporation of California
Filed Jan. 8, 1968, Ser. No. 696,387
Int. Cl. E04g 1/18
U.S. Cl. 182—148                                              6 Claims

ABSTRACT OF THE DISCLOSURE

A self-contained, fluid-powered, mobile tower assembly which can be operated in dangerous atmospheres without risk of causing fire or explosion and having provision for controlling and driving all components without electrical energy and solely from a supply of pressurized fluid. The tower is actuated by hydraulic means powered and controlled pneumatically via a flexible hose connection to an air source. Flexible tubing is employed to interconnect all pneumatic components which include one and preferably two control stations, one being at ground level and one being on the extendable tower structure.

---

This invention relates to extendable mobile tower assemblies and more particularly an improved assembly of this character safely operable in dangerous atmospheres without risk of causing fire or explosion by virtue of being powered entirely by pressurized fluid and having no electrical components capable of producing sparks or heat.

Extendable tower assemblies are being used in increasing numbers and varieties of applications to perform maintenance, service and assembly operations at different elevations above the ground. Many of these applications require the use of the assemblies in areas inherently or possibly having present therein fumes or explosive gases likely to be ignited in the presence of heat or sparks. For example, one of the many typical uses for tower assemblies is in the servicing of aircraft where oil and fuel fumes are unavoidably present and the cause of dangerous conditions. A spark or an overheated component of electrical equipment on servicing equipment could start a fire or initiate an explosion of highly dangerous potentials to both personnel and equipment.

In view of the foregoing it is a primary object of the present invention to provide a simply fabricated and operated mobile tower assembly of highly rugged reliable construction powered entirely by fluid operated components, including all controls. The extendable mast for the tower assembly is hydraulically powered but all driving and control equipment therefor is provided by pneumatically operated components. The air supply for this system is most conveniently supplied through a readily detachable flexible hose connection leading to a source of pressurized air. This supply hose can be quickly uncoupled when the assembly is not in use or during movement from one operating position to another. The pneumatic components include separate manual controls at different operator stations located both at ground level and on the working platform and are selectively operable to control operation of an air motor driving the hydraulic components and to lower the tower. Air for control functions is supplied through flexible hose connections at least some of which are preferably enclosed in a single protective tube normally stored in a resilient helical coil near the base of the mast.

It is therefore a primary object of the present invention to provide a self-contained, mobile tower assembly of inexpensive construction capable of being operated in dangerous atmospheres without risk of fire or explosion and powered entirely by pressurized fluid controlled without need for electrical energy.

Another object of the invention is the provision of a mobile self-contained extendable tower assembly featuring a hydraulically operated tower structure powered by pneumatic motive means under the control of pressurized air lines.

Another object of the invention is the provision of a mobile tower assembly and energized and controlled by a combination of pressurized gas and pressurized liquid having no components capable of producing sparks or heat.

These and other objects will appear upon reading the following specification and claims and upon considering in connection therewith the attached drawing to which they relate.

Referring now to the drawing in which a preferred embodiment of the invention is illustrated.

Figure 1:
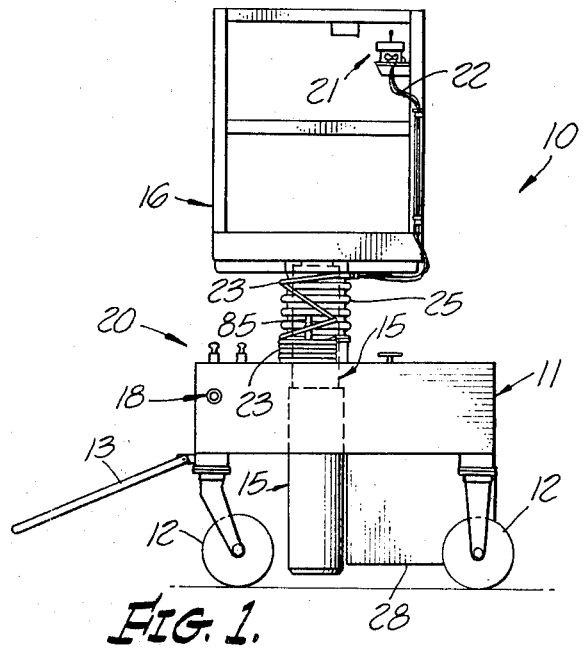
FIG. 1 is a side elevational view of one preferred embodiment of the invention showing the mast retracted.
Figure 3:
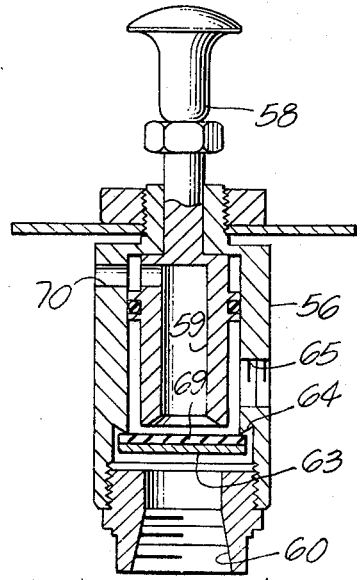
FIG. 3 is a vertical sectional view through one of the manual controls.

Referring more particularly to FIG. 1, there is shown an illustrative embodiment of the invention mobile tower assembly, designated generally 10, having a main frame 11 supported upon wheels 12 and provided with a handle or tongue 13 for convenience in moving the tower from place to place. The extendable tower comprises a multiple-stage hydraulically operated mast 15 having its larger diameter stage rigidly fixed to main frame 11 and having a suitable workman's platform and station 16 suitably secured to its upper end. Main frame 11 is provided with one end portion of a separable coupling 18 having known provision of quickly attaching and detaching a flexible air hose leading to a source of pressurized air. The air so supplied to the tower assembly is utilized in a manner to be explained presently for controlling and driving pump means and other controls supplying pressurized hydraulic fluid to operate mast 15.

Tower assembly 10 is preferably provided with two or more control stations by which the tower can be operated selectively from ground level or from a position on platform 16. The lower or ground station control position is indicated generally at 20 and the alternate control station on the platform is indicated at 21. Flexible tubing 22 interconnecting these two control stations is clipped to the side of platform 16 and these are preferably encased within a flexible helical coil 23 supported in an appropriate location on main frame 11.

Another safety feature of the invention tower assembly comprises a corrugated collapsible tubular boot 25 enclosing mast 15. Boot 25 may be formed of any suitable impervious material and has an internal diameter sufficiently large as to be free of contact with the mast, the upper end of the boot being suitably lamped to the mast closely beneath platform 16 and the lower end being similarly clamped about the base of the mast. This boot improves the overall appearance and avoids the possibility of the hydraulic fluid leaking past joints of the mast from escaping or becoming ignited by a spark or open flame.

Referring now to FIGS. 2 to 5 there are shown the essential details of connections for both the hydraulic and pneumatic components. In accordance with conventional practice, mast 15 is operated between its retracted and extended positions by pressurized hydraulic fluid contained in a reservoir 28 having a vent 29 to the atmosphere. Fluid is supplied from this reservoir through a pipe 30 to the inlet of pump 31. The outlet conduit 32 from this pump extends to mast 15 via the usual check valve 33. A pressure relief valve 35 permits fluid in excess of a predetermined pressure to return to the reservoir through return conduit 36. A second return pipe in parallel with conduit 36 includes a normally closed valve 38 of the type well known in this art and diagrammatically illustrated in greater detail in FIG. 5. This valve is normally urged closed by spring 39 but the spring can be overcome and the valve moved to its open position when pressurized air is admitted to chamber 40 having a bottom wall formed by the flexible diaphragm 41 bearing against spring 39.

Pump 31 is driven by an air motor flexibly coupled to the pump shaft by coupling 46. Motor 45 is supplied with pressurized air through a conduit 48 having its inlet end connected to hose coupling 18. Conduit 48 includes the usual pressurized air line accessories, including a filter 49, a pressure regulator 50, an oiler 51, and a normally closed air-operated control valve 52 having the same constructional features as valve 38 shown in FIG. 5. Spent air exhausts to the atmosphere from motor 45 through air muffler 54.

Figure 2:
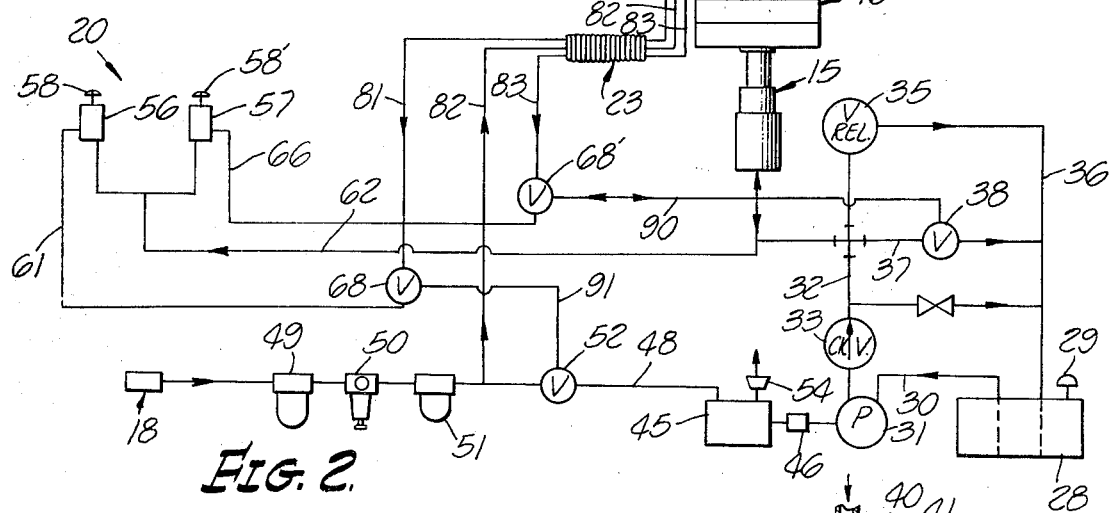
FIG. 2 is a schematic showing of both the pneumatic and hydraulic power and control components.

The means here shown at control stations 20 and 21 for controlling the operation of mast 15 and air motor 45 will now be described by reference to FIG. 2. Referring first to control station 20 it will be understood that this station is provided with a pair of identical controls 56, 57 one of which is shown on an enlarged scale and in section in FIG. 3. An understanding of valve 56 will therefore serve for both. This control has a main body slidably seating a control member 58 having in inverted L-shaped passage 59. The lower end of the main housing has a threaded inlet 60 connectible to a flexible hose 61 (FIG. 2) in communication with the air supply line 48. The pressurized air normally present in line 61 acts to hold a valve disc 63 closed against valve seat 64, thereby preventing pressurized air from flowing through outlet passage 65 into the flexible hose 66 leading to a two-position shuttle valve 68. However, if the operating plunger 58 is shifted downwardly until its lower end seats against the resilient material 59 on valve disc 63, the inlet to the L-shaped passage 59 is closed as valve disc 63 is shifted downwardly off its seat 64, permitting pressurized air to flow past seat 64 into line 66. If plunger 58 is now pulled upwardly, valve 63 closes against seat 64 following which, the pressurized air present in hose 66 escapes upwardly through passage 59 and thence to the atmosphere through port 70.

Figure 4:
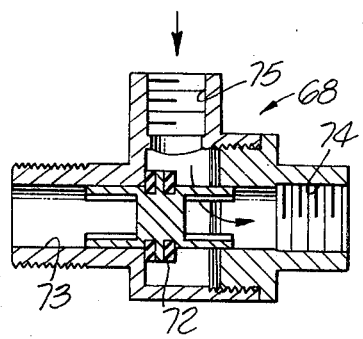
FIG. 4 is a cross-sectional view through one of the shut-off valves.
Figure 5:
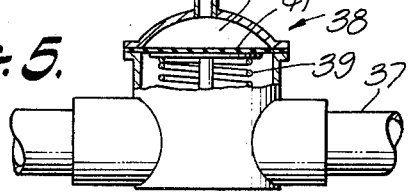
FIG. 5 is a fragmentary view partially in section of one of the pneumatically operated valves.

Shuttle valves 68, 68' are of identical construction and one of these is shown on enlarged scale in FIG. 4. Flow through the T-shaped valve body is controlled by a shuttle valve 72. As shown in FIG. 4 this valve is shifted to the left cutting off flow through passage 73 but permitting air to flow between passages 74 and 75 as is indicated by the arrows. Valve 72 is shiftable between its alternate operating positions by air pressure acting on one or the other sides thereof. For example, when valve plunger 58 is elevated after being held depressed, the pressurized air present in line 61 is permitted to vent to the atmosphere and valve 62 which had been positioned to the right as viewed in FIG. 4, now shifts to the full line position shown thereby permitting pressurized air to enter passage 75 and to exit through passage 74 of the shuttle valve.

The control valve shown at upper operator control station 21 serves the same functions as valves 56, 57 but, in this case, comprises a single housing 80 having three inlets to which the flexible air hoses 81, 82, 83 are connected. The operator control handle 84 is normally in an upright position wherein it is effective in known manner to prevent pressurized air from flowing from supply pipe 82 to either of the outlet pipes 81, 83. However, when handle 84 is pivoted through a small arc to the right pressurized air is supplied to hose 83 and when it is pivoted to a similar arc from neutral position to the left, pressurized air is supplied to hose 81.

It will be understood that the flexible tubes 81, 82, 83 connected between the elevated control station 21 and equipment in the base of the tower are preferably enclosed in the flexible tubular jacket 23 referred to above and preferably preformed into a resilient helical coil having its lower convolutions resting against the top of main frame 11 as is best shown in FIG. 1. In further explanation, it is pointed out that this protective tubular enclosure may be formed of a reasonably firm-bodied thermoplastic material of a tough abrasion-resistant character providing excellent protection for the three small diameter flexible tubes enclosed therewithin and having a natural tendency to resume its closely coiled helical condition illustrated in FIG. 1. However, as the mast is extended this helical coil also extends from its upper end. As the tower is lowered the coil resumes its closely and compactly coiled condition, its position on the main frame being assisted if necessary by an upright mandrel 85.

Operation of the illustrated apparatus is believed quite apparent from the foregoing detailed description of the components and their functional and operative connections to one another. Let it be assumed that a flexible supply hose of pressurized air has been connected to coupling 18 on the main frame. Pressurized air will then be supplied to each of the control stations via hoses 62 and 82. Let it be assumed that the operator wishes to extend the tower from its fully retracted position. He may do so by operating the controls at either of the control stations 20 or 21. Assuming that he wishes to operate the tower from station 20, he depresses control plunger 58 thereby pressing the lower of the plungers against the upper side of valve disc 63 thereby first cutting off the vent opening through the plunger and thereafter opening the valve disc to admit pressurized air from hose 62 to hose 61. This air enters the chamber above the flexible diaphragm 41 in valve 52 and supplies pressurized air to drive pump motor 45. Operation of the pump supplies pressurized hydraulic fluid from reservoir 28 to mast 15 thereby extending the mast and raising the workman's platform 16. The platform continues to rise so long as control handle 58 is held depressed. To stop the platform at any selected elevation, the operator merely pulls handle 58 upwardly allowing the air pressure below valve 63 to reseat this valve against its seat 64 thereby cutting off the supply of air to air motor 45. Check valve 33 and the normally closed valve 38 hold the fluid trapped in the mast thereby holding it rigidly in its selected extended position.

If the workman on the tower wishes to raise or lower the platform he merely operates handle 84 to the left or right depending on the direction he wishes the platform to move. Assuming he wants to lower the platform slightly he shifts lever 84 to the right allowing pressurized air to flow from supply hose 82 into hose 83. If shuttle member 72 in valve 68' is closed upwardly, the air pressure in line 83 will shift it downwardly and allow the pressurized air to flow into line 90 and thence into the diaphragm chamber 40 at the top of the normally closed valve 38. This valve will now open and release hydraulic fluid to flow through line 37 back into reservoir 28. As soon as the mast has lowered to the desired point, the operator allows handle 84 to return to its upright neutral position whereupon spring 39 closes valve 38 and prevents any further fluid to escape from the mast.

If the ground operator wishes to lower the mast further, he depresses handle 58' thereby allowing pressurized air to flow from supply line 62 into line 66. If member 72 of shuttle valve 68' is closed downwardly, the air closes it upwardly thereby allowing air to flow into line 90 and open valve 38 so that hydraulic fluid can escape from the mast to reservoir 28. When this desired lowering has been accomplished, member 58' is raised thereby discontinuing the lowering operation abruptly.

It will therefore be evident from the foregoing description that the mast can be extended and retracted in any desired amount from either the ground or the top of the mast by appropriate manipulation of the separate controls provided at each control station.

While the particular hydraulically powered tower assembly with pneumatic drive and control accessories herein shown and disclosed in detail is fully capable of attaining the objects and providing the advantages hereinabove stated, it is to be understood that it is merely illustrative of the presently preferred embodiments of the invention and that no limitations are intended to the details of construction or design herein shown other than as defined in the appended claims.

We claim:

1. A mobile hydraulically-powered pneumatically-controlled extendable tower assembly adapted to be operated in explosive and the like dangerous atmospheres without need for electrical power likely to produce fire and explosion initiating sparks, said tower assembly having a mobile main frame at the base end thereof, a hydraulically-powered vertically extendable tower structure mounted thereon, hydraulic fluid storage tank means on said main frame, pneumatically-driven hydraulic fluid pumping means adjacent said tank connected in a fluid circuit with said tank and said tower structure, and pneumatically powered non-electrical remote control means extending between the upper end of said tower structure and said pneumatically-driven pumping means operable to control the raising and lowering of said tower structure selectively from control stations at the upper and lower ends of said tower structure.

2. A tower assembly as defined in claim 1 characterized in the provision of coupling means mounted on said main frame for detachably connecting a supply hose from a source of pressurized air to the aforementioned pneumatic components on said frame to provide air for operating said hydraulically powered tower structure.

3. A tower assembly as defined in claim 1 characterized in that said pneumatic controls include manually operated means positioned at a plurality of spaced-apart control stations and selectively usable to energize and de-energize said hydraulically powered tower structure from any of said control stations.

4. A tower assembly as defined in claim 1 characterized in that said extendable power structure includes a multi-stage mast, and corrugated axially-collapsible tubing means surrounding the major length of said mast and effective to enclose the same and to prevent the escape of hydraulic fluid or contact of the latter with sparks or a flame.

5. A tower assembly as defined in claim 3 characterized in the provision of a plurality of non-metallic flexible tubes enclosed within a common larger diameter flexible tube extending between said pneumatic controls and said pneumatically driven means.

6. A tower assembly as defined in claim 5 characterized in that larger diameter flexible tube is preformed as a close-wound helix and tends to resume that shape when not under load axially of said helix.

References Cited

UNITED STATES PATENTS

| | | | |
|---|---|---|---|
| 2,676,677 | 4/1954 | Anderson et al. | 182—148 |
| 3,016,989 | 1/1962 | Lindmark | 182—148 |
| 3,132,718 | 5/1964 | Pierce | 182—2 |
| 3,213,948 | 10/1965 | Eckels | 182—2 |
| 3,365,080 | 1/1968 | Crull | 182—148 |

REINALDO P. MACHADO, Primary Examiner